Patented Dec. 10, 1940

2,224,520

UNITED STATES PATENT OFFICE 2,224,520

COATING AND FILLING MATERIAL

Howard D. Meincke, Glencoe, Ill., assignor to A. M. Meincke & Son, Inc., a corporation of Illinois No Drawing. Application July 29, 1939, Serial No. 287,413

8 Claims. (Cl. 134—16)

This invention relates to an improved coating and filling material and more particularly to an improved coating and filling composition for paper.

A wide variety of substances is now employed for coating and filling purposes. Among these are clay, calcium carbonate and gypsum and some finely divided crystalline materials. These vary among themselves as to opacity, covering power, solubility, retention by paper pulp and in other ways. In no case is the retention as high as is desirable.

It has now been discovered that ordinary filling materials may be incorporated with colloidal magnesium-calcium silicate with the result that the retention thereof is greatly increased. At the same time the silicate itself is a valuable coating or filling material of very considerable opacity and covering power. A preferred colloidal silicate is mined at Hector, California. The composition thereof differs considerably, but the ratio of combined calcium and magnesium oxides is generally within the range from five parts of silicon dioxide to four parts of combined calcium and magnesium oxides to three parts of silicon dioxide to five parts of combined calcium and magnesium oxides. The material may contain considerable amounts of aluminum oxide and contains a very considerable amount of water of hydration.

The most colloidal material has the following approximate composition:

| | Per cent |
|---|---|
| Silica — $SiO_2$ | 21.80 |
| Carbon dioxide—$CO_2$ | 21.73 |
| Fluorine — F | 2.72 |
| Acid soluble iron and alumina ($Fe_2O_3$ + $Al_2O_3$) (soluble in 30% acetic acid) | Trace |
| Acid insoluble iron oxide—$Fe_2O_3$ | 0.03 |
| Acid insoluble alumina—$Al_2O_3$ | 0.36 |
| Acid soluble calcium oxide—CaO | 30.48 |
| Acid insoluble calcium oxide—CaO | 1.34 |
| Acid soluble magnesium oxide—MgO | 1.31 |
| Acid insoluble magnesium oxide—MgO | 9.85 |
| Loss on ignition (chiefly water) | 10.38 |
| | 100.00 |

Test for heavy metals other than iron, negative.

Somewhat less colloidal material has the following composition:

| | Per cent |
|---|---|
| Silica — $SiO_2$ | 24.50 |
| Carbon dioxide—$CO_2$ | 22.20 |
| Fluorine as F | 2.72 |
| Alumina—$Al_2O_3$ in 30% acetic acid soluble | 0.25 |
| Alumina—$Al_2O_3$ acid insoluble | 0.28 |
| Iron oxide—$Fe_2O_3$ acetic acid soluble | 0.01 |
| Iron oxide—$Fe_2O_3$ acid insoluble | 0.07 |
| Calcium oxide—CaO acetic acid soluble | 26.80 |
| Calcium oxide—CaO acid insoluble | 2.02 |
| Magnesium oxide—MgO acetic acid soluble | 1.30 |
| Magnesium oxide—MgO acid insoluble | 10.90 |
| Loss on ignition (chiefly water) | 8.95 |
| | 100.00 |

As an example of an analysis of other material of the same type but slightly less colloidal in character, the following composition is typical:

| | Per cent |
|---|---|
| Silicon dioxide | 32.42 |
| Iron oxide | 0.05 |
| Aluminum oxide | 5.69 |
| Calcium oxide (inert) | 26.91 |
| Magnesium oxide | 11.92 |
| Sodium oxide | 1.52 |
| Potassium oxide | Trace |
| Fluorine in combination | 7.00 |
| Loss on ignition | 14.83 |
| | 100.34 |

The colloidal silicate in many of its characteristics resembles bentonite. It has the swelling properties of bentonite, but is snow white in color and does not tend to form segregations as does bentonite. The present material may be mixed with water in considerable quantities and will form a uniform suspension, whereas bentonite has a considerable tendency to form lumps.

The colloidal magnesium-calcium silicate is preferably mixed with a less expensive filler in a small proportion, normally from 1% to 75% and preferably from 5% to 25% of the colloidal material being utilized. For example, a mixture of ordinary clay to which is added 200 pounds of the colloidal calcium magnesium silicate to a ton of clay produces a material which will suspend in water for an indefinite period and the retention of which upon paper pulp is most remarkable. The same is true of calcium carbonate and gypsum as well as other inert fillers. In the case of gypsum the colloidal calcium silicate appears to reduce the solubility of the gypsum.

The material is preferably employed in paper making in combination with a starch size. For example, with 2000 lbs. of paper pulp (dry basis), 400 lbs. of the colloidal material and ½ to 2% of starch are employed. Preferably the starch is a cold swelling material such as disclosed in Oltmans' Patent No. 2,105,052, issued January 11, 1938.

The material may likewise be used for coating finished or partially finished fabrics inasmuch as it clings with great tenacity to any surface upon which it dried. It has a pleasing uniform appearance.

The material may also be used as an emulsifying agent to replace bentonite; for example, in the preparation of asphalt emulsions, other emulsions, and similar uses.

What I claim as new, and desire to secure by Letters Patent is:

1. A filling composition including an inert filler and colloidal magnesium-calcium silicate.

2. A filling composition including an inert filler and 5% to 25% of colloidal magnesium-calcium silicate.

3. A paper filler comprising an inert filling material and 5% to 25% of colloidal magnesium-calcium silicate.

4. The method of increasing the retention of fillers in aqueous mediums which comprises incorporating therewith a minor proportion of colloidal magnesium-calcium silicate.

5. A paper filler comprising an inert filling material and 1% to 75% of colloidal magnesium-calcium silicate based upon the weight of the inert filling material.

6. A paper filler comprising starch and colloidal magnesium-calcium silicate.

7. A paper filling composition comprising approximately 20 parts of colloidal magnesium silicate and ½ to 2 parts of starch.

8. A fibre paper containing as an essential filling ingredient thereof an inert filling material including 5% to 25% of colloidal magnesium-calcium silicate.

HOWARD D. MEINCKE.